United States Patent
Brill et al.

(10) Patent No.: US 7,350,606 B2
(45) Date of Patent: Apr. 1, 2008

(54) DOUBLE REDUCTION ELECTRIC DRIVE WHEEL ASSEMBLY

(75) Inventors: Lawrence D. Brill, Westerville, OH (US); Tomaz Dopico Varela, Shelby Township, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 490 days.

(21) Appl. No.: 11/058,146

(22) Filed: Feb. 15, 2005

(65) Prior Publication Data

US 2006/0180366 A1    Aug. 17, 2006

(51) Int. Cl.
*B60K 1/00* (2006.01)
(52) U.S. Cl. .................. 180/65.5; 180/65.6; 475/5
(58) Field of Classification Search .............. 180/65.6, 180/371, 372, 342, 343, 65.5; 475/4, 5, 28, 475/29, 248, 249, 302, 303
See application file for complete search history.

(56) References Cited

U.S. PATENT DOCUMENTS

| | | | |
|---|---|---|---|
| 4,754,949 A * | 7/1988 | Fukamachi | 251/129.03 |
| 5,947,855 A * | 9/1999 | Weiss | 475/5 |
| 6,276,474 B1 | 8/2001 | Ruppert et al. | |
| 6,461,265 B1 * | 10/2002 | Graham et al. | 475/5 |
| 2002/0134597 A1 * | 9/2002 | Mann et al. | 180/65.5 |
| 2004/0116228 A1 * | 6/2004 | Thompson | 475/28 |
| 2004/0162176 A1 * | 8/2004 | Foster | 475/210 |

* cited by examiner

*Primary Examiner*—Christopher P. Ellis
*Assistant Examiner*—John D Walters
(74) *Attorney, Agent, or Firm*—Carlson, Gaskey & Olds

(57) ABSTRACT

A drive unit for a vehicle wheel assembly includes an input gear set driven by an electric motor, a planetary gear set driven by the input gear set, and an output shaft driven by the planetary gear set. An adapter is used to attach a wheel rim and a brake component for rotation with the output shaft, which is rotatably supported by a wheel bearing. The input gear set and the planetary gear set are positioned outboard of the electric motor and inboard of the brake component. The brake component can be easily removed without requiring removal of the planetary gear set or any wheel bearings. Only the wheel rim and the adapter have to be removed in order to remove the brake component.

22 Claims, 3 Drawing Sheets

DOUBLE REDUCTION ELECTRIC DRIVE WHEEL ASSEMBLY

TECHNICAL FIELD

A vehicle wheel for an electric drive axle includes an electric motor for driving a double reduction gear assembly incorporated into the vehicle wheel, such that a brake component can be removed from the vehicle wheel without removing the double reduction gear assembly.

BACKGROUND OF THE INVENTION

Mass transit vehicles, such as trolley cars, buses, etc., typically have seats aligned at the lateral sides of the vehicle, with a central aisle and floor extending along the vehicle. In order to facilitate entering and exiting from the vehicle, it is desirable to have the floor and aisle positioned relatively low to the ground. This provides faster cycle time during stops and facilitates boarding for all passengers, especially children, the elderly and disabled passengers.

Mass transit vehicles typically have several axles that support, drive and steer the vehicle. Many such vehicles provide a rigid drive axle having a central or offset input that is coupled to a driveline. Disadvantageously, this arrangement prohibits lowering the vehicle floor to desired levels due to the use of a rigid axle housing in combination with the position of the input and the associated driveline.

One solution has replaced a traditional rigid drive axle configuration with independent wheel drives. In this configuration, electric motors are mounted at each wheel, allowing the floor to be lowered closer to ground level. When electric motors are utilized at each wheel, typically a double reduction gear assembly is required to achieve desired levels of output torque and speed. The double reduction gear assembly typically includes a first reduction gear set that is coupled to the electric motor and a second reduction gear set that is incorporated into the wheel. The second reduction gear set is typically a planetary gear set that is directly incorporated into a wheel hub at each wheel. The first reduction gear set is mounted inboard of the wheel hub. The wheel hub is supported on wheel bearings and also supports a brake component, such as a brake rotor or brake drum.

One disadvantage with this configuration is that when service operations are required for brake components, the wheel hub must be disassembled from the wheel. Disassembly of the wheel hub requires removal of the planetary gear set and associated wheel bearings. This is time consuming and increases maintenance and service costs.

Accordingly, it is desirable to provide vehicle wheel assembly for a low floor vehicle application that does not require removal of any gear reduction sets or wheel bearings in order to service brake components.

SUMMARY OF THE INVENTION

A vehicle wheel assembly includes a double reduction gear set that drives an output shaft. The output shaft is coupled to rotate a wheel rim and associated brake component. The brake component is removable from the output shaft without requiring removal or disassembly of the double reduction gear set.

In one example configuration, the double reduction gear set includes an input gear set driven by an electric motor and a planetary gear set driven by the input gear set. The planetary gear set drives the output shaft. An adapter secures the wheel rim and the brake component to rotate with the output shaft. The planetary gear set and the input gear set are both positioned inboard from the brake component and the adapter. To service the brake component, only the adapter and wheel rim are removed.

In one disclosed embodiment, the input gear set includes a pinion gear that is directly driven by an electric motor output shaft and an annular gear that is directly driven by the pinion gear. The pinion gear and the annular gear rotate about axes that are parallel to each other. The annular gear drives the planetary gear set. In one example configuration, the annular gear is positioned inboard from the planetary gear set. In another example configuration, the annular gear directly surrounds an outer circumferential surface of the planetary gear set to provide a more compact assembly.

In either configuration, the annular gear drives the planetary gear set through a shaft connection. The planetary gear set includes a sun gear, a plurality of planet gears in meshing engagement with the sun gear, a planetary carrier supporting the plurality of planet gears through planet pin connections, and a planetary ring gear that is in meshing engagement with the plurality of planet gears. The sun gear is fixed for rotation with a shaft that is driven by the annular gear. The sun gear drives the plurality of planet gears, which in turn drives the output shaft, which is attached to the planet carrier.

In one disclosed embodiment, a gear housing substantially encloses the input gear set, the planetary gear set, and the output shaft. A bearing set including at least one wheel bearing is mounted directly between the output shaft and the gear housing. The output shaft includes a flanged end to which the adapter is attached. The adapter is also used to secure, at least in part, the brake component for rotation with the output shaft. When the brake component is removed for service, only the adapter and the wheel rim are required to be removed. The bearing set, input gear set, and planetary gear set do not have to be removed or disassembled from the vehicle wheel assembly.

These and other features of the present invention can be best understood from the following specification and drawings, the following of which is a brief description.

DETAILED DESCRIPTION OF THE PREFERRED EMBODIMENT

Figure 1:
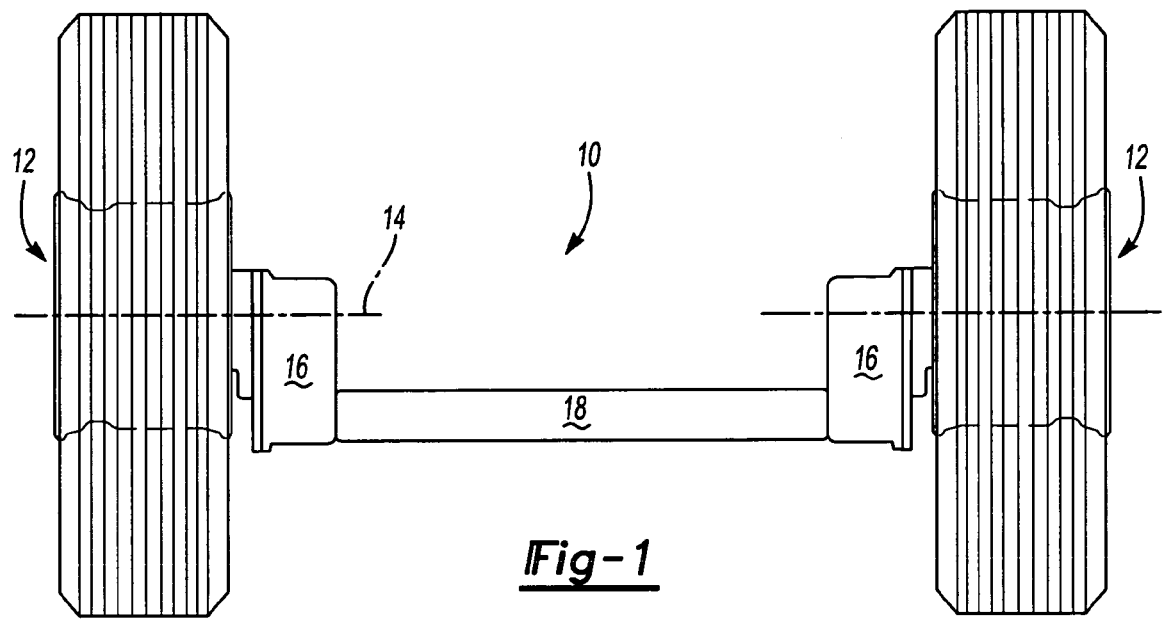
FIG. 1 is a schematic view of a vehicle drive assembly for driving a pair of laterally spaced vehicle wheel assemblies.

FIG. 1 shows an axle assembly 10 for a vehicle having a low floor configuration. The axle assembly 10 includes a pair of wheel assemblies 12 that rotate about a wheel axis of rotation 14. The wheel assemblies 12 are laterally spaced apart from each other along the wheel axis of rotation 14 and are independently driven by electric motors 16. A single electric motor 16 can be used to drive each wheel assembly 12, or multiple electric motors 16 could be used to drive each wheel assembly 12.

In one example, a rigid axle housing member 18 extends between the electric motors 16 to provide support, however, the rigid axle housing member 18 may not be required in certain mounting configurations.

Figure 2:
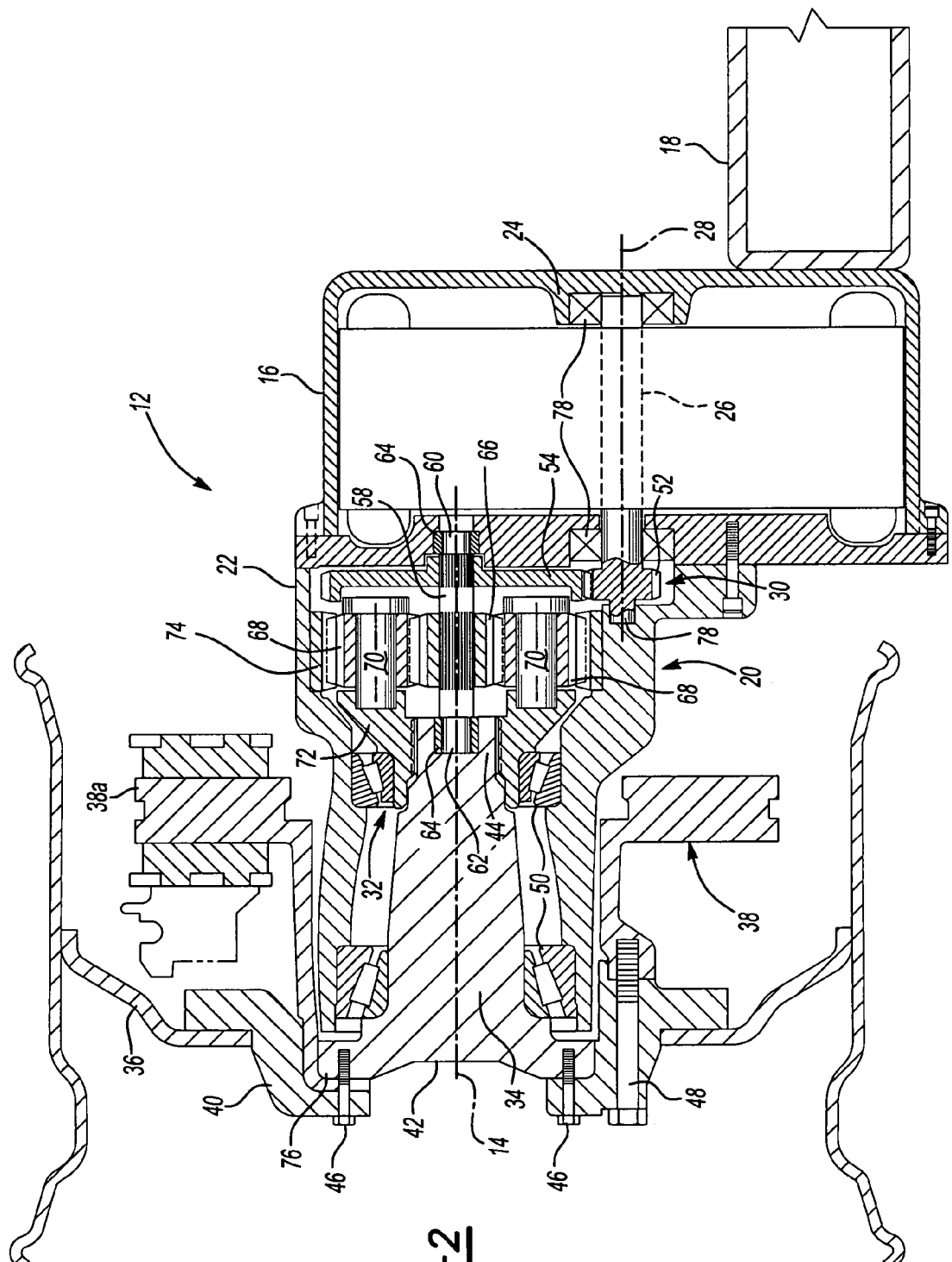
FIG. 2 is a schematic cross-sectional view of a vehicle wheel assembly incorporating the subject invention.

An example of one wheel assembly 12 is shown in FIG. 2. While only one wheel assembly 12 is shown, it should be understood that the opposite wheel assembly 12 is similarly configured. The wheel assembly 12 includes a double reduction gear set, shown generally at 20, that is enclosed within a gear housing 22. The electric motor 16 includes a motor housing or casing 24 that is mounted to the gear housing 22. The casing 24 and/or gear housing 22 can be independently supported at each wheel assembly 12 or can be supported on a vehicle frame member (not shown). The electric motor 16 drives a motor output shaft 26 that rotates about a motor axis of rotation 28.

The double reduction gear set 20 includes an input gear set 30 and a planetary gear set 32. The input gear set 30 is driven by the motor output shaft 26 and the planetary gear set 32 is driven by the input gear set 30. The planetary gear set 32 drives an output shaft 34 that drives a wheel component, such as a wheel rim 36, for example.

Figure 3:
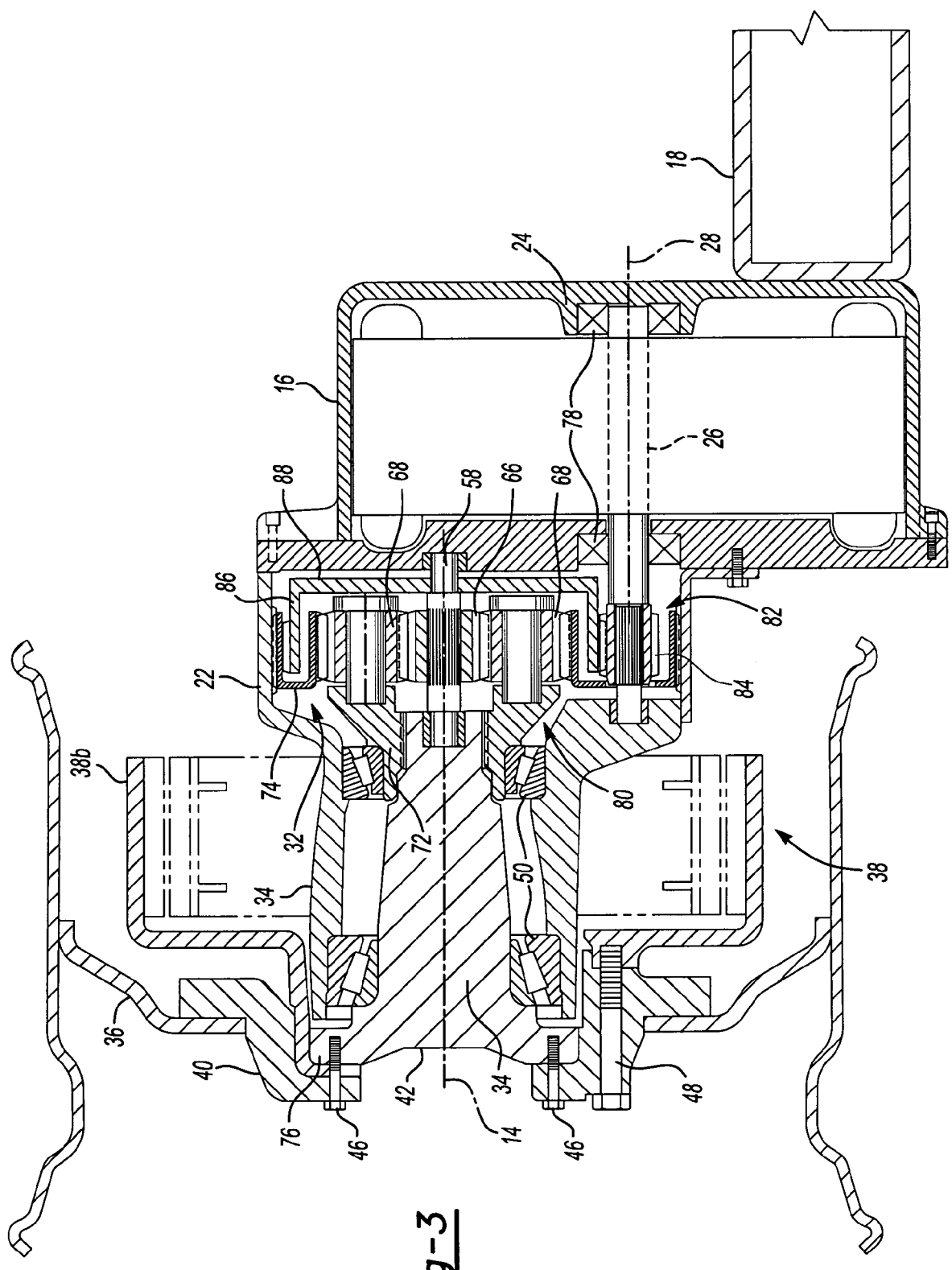
FIG. 3 is a schematic cross-sectional view of another example of a vehicle wheel assembly incorporating the subject invention.

A brake component 38 is mounted for rotation with the output shaft 34 by an adapter 40. The brake component 38 can be a brake rotor 38a, as shown in FIG. 2, or a brake drum 38b, as shown in FIG. 3. The output shaft 34 rotates about the wheel axis of rotation 14 and includes an outboard end 42 and an inboard end 44. The adapter 40 is mounted to the outboard end 42. It should be understood that the term "inboard" refers generally to a direction toward a longitudinal vehicle centerline and the term "outboard" refers generally to a direction away from the longitudinal vehicle centerline.

In one example, the adapter 40 is mounted to the output shaft 34 with a plurality of fasteners 46, however, other known attachment structures could also be used. The brake component 38 is mounted to the adapter 40 with another plurality of fasteners 48 (only one is shown in FIGS. 2 and 3), however, other known attachment structures could also be used. The adapter 40 is also used to attach the wheel rim 36 for rotation with the output shaft 34.

The planetary gear set 32 is incorporated into the gear housing 22 to drive the output shaft 34 at the inboard end 44. By positioning the planetary gear set 32 inboard of the brake component 38 and outboard of the electric motor 16 and by using the adapter 40 to couple the brake component 38 to the output shaft 34, the brake component 38 can be quickly and efficiently removed for service operations without having to disassemble or remove the planetary gear set 32.

Further, at least one wheel bearing 50 is mounted between the gear housing 22 and the output shaft 34. In the example shown in FIG. 2, a pair of wheel bearings 50 are used to rotatably support the output shaft 34, adapter 40, wheel rim 36, and brake component 38 for rotation relative to the gear housing 22. To remove the brake component 38, only the wheel rim 36 and adapter 40 need be removed. The wheel bearings 50 and double reduction gear set, including the planetary gear set 32 and the input gear set 30, do not have to be disassembled or removed. This reduces maintenance downtime and cost.

In the configuration shown in FIG. 2, the input gear set 30 includes a pinion gear 52, which is directly driven by motor output shaft 26, and an annular gear 54. Annular gear 54 includes a plurality of gear teeth formed about an outer circumference 56 that directly mesh with a plurality of gear teeth formed on the pinion gear 52. The annular gear 54 is positioned inboard of the planetary gear set 32 and is splined or otherwise attached to drive a stub shaft 58.

The stub shaft 58 includes an inboard end 60 and an outboard end 62. The outboard end 62 extends into a cavity formed within the inboard end 44 of the output shaft 34 and the inboard end 60 of the stub shaft 58 is supported within the gear housing 22. The inboard end 60 and outboard end 62 may be supported on bushings or bearings 64 as needed.

The planetary gear set 32 includes a sun gear 66 that is splined or otherwise fixed for rotation with the outboard end 62 of the stub shaft 58. The sun gear 66 meshes with a plurality of planet gears 68, which are supported on planet pins 70 fixed to planet carrier 72. The planet gears 68 intermesh with a planetary ring gear 74 that is fixed to the gear housing 22. The planet carrier 72 includes an internal bore that receives the inboard end 44 of the output shaft 34. The planet carrier 72 is splined or otherwise similarly attached to the output shaft 34. Thus, in the configuration shown in FIG. 2, the pinion gear 52 directly drives the annular gear 54; the annular gear 54 directly drives the stub shaft 58; the stub shaft 58 directly drives the sun gear 66; the sun gear 66 directly drives the planet gears 68; the planet gears 68 drive the planet carrier 72 via a connection with the planet pins 70; and the planet carrier 72 directly drives the output shaft 34.

The output shaft 34 includes a flange portion 76 that extends outboard of the gear housing 22 for attachment to the adapter 40. The output shaft 34, the adapter 40, the wheel rim 36, the brake component 38, the sun gear 66, planet carrier 72, and the annular gear 54 all rotate about the wheel axis of rotation 14. The wheel axis of rotation 14 is parallel to and spaced apart from the motor axis of rotation 28. Further, the motor axis of rotation 28 is vertically lower than the wheel axis of rotation 14, which further facilitates lowering a vehicle floor closer to ground level.

The motor output shaft 26 extends outboard from the motor casing 24 and into the gear housing 22. The pinion gear 52 is mounted to the motor output shaft 26, which is supported on bushings and/or bearings 78 as needed.

Figure 4:
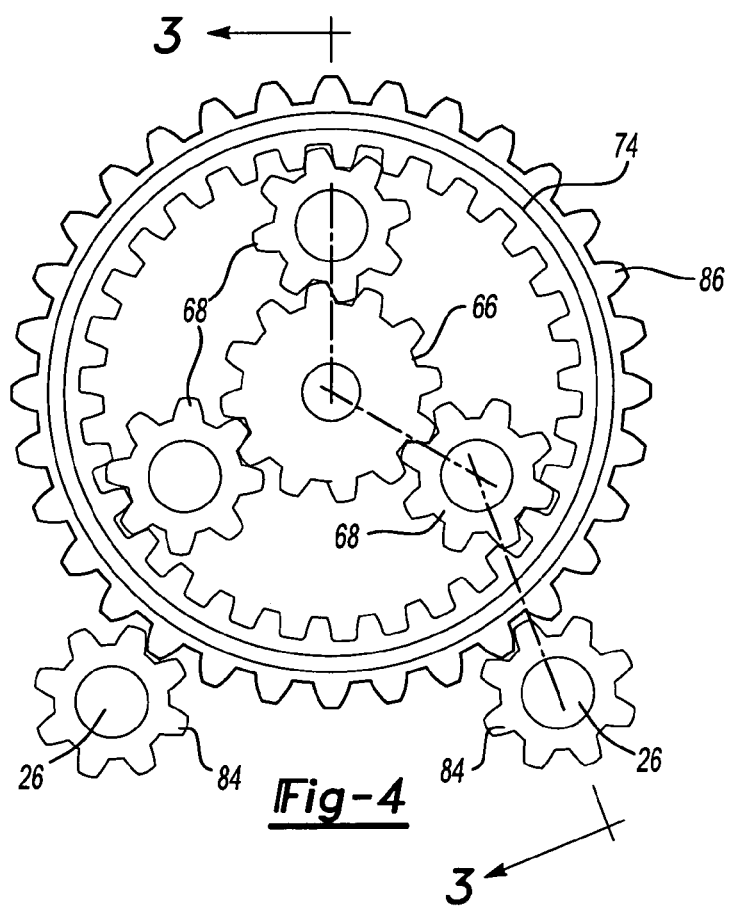
FIG. 4 is a schematic end view of a double reduction gear configuration as used in the vehicle wheel assembly of FIG. 3.

Another example of a wheel assembly 12 with a double reduction gear set 80 is shown in FIGS. 3-4. This configuration is similar to that shown in FIG. 2, however, this double reduction gear set 80 includes a different input gear set configuration that permits the use of multiple electric motors 16. The double reduction gear set 80 of FIGS. 3 includes an input gear set 82 and the planetary gear set 32. The planetary gear set 32 as described above is similar to that with regard to FIG. 2.

The input gear set 82 includes a pinion gear 84 that is directly driven by the motor output shaft 26 and an annular gear 86 that is in meshing engagement with the pinion gear 84. The annular gear 86 includes teeth formed about an outer circumference of the annular gear. The annular gear 86 is positioned to surround a portion of the outer circumferential area of the planetary gear set 32 in an overlapping relationship. Specifically, the annular gear 86 surrounds an outer circumference of the planetary ring gear 74.

A drive member 88 connects the annular gear 86 to the stub shaft. In the example shown, the drive member 88 is a side plate that is integrally formed with the annular gear 86. Optionally, the drive member 88 could comprise a plate that is fixed at an outer circumferential area to an edge of the annular gear 86. In either configuration, the plate includes an opening at an inner circumferential area that is splined or otherwise similarly attached to the stub shaft 58. The stub shaft 58 drives the planetary gear set 32 as described above.

This configuration provides a more compact wheel assembly 12, which allows the electric motor 16 to be positioned closer to the wheel assembly 12. In other words, the electric motor 16 can be moved to a more outboard position than that shown in FIG. 2. Further, the input gear set 82 with the annular gear 86 can be driven by more than one motor output shaft 26, as shown in FIG. 4. FIG. 4 shows the use of two (2) motor output shafts 26, which drive two (2) pinion gears 84. However, while only two (2) motor output shafts 26 are shown, additional motor output shafts 26 could also be used depending upon the vehicle application.

In the configuration shown in FIG. 3, the pinion gear 84 directly drives the annular gear 86; the annular gear 86 drives the stub shaft 58 via drive member 88; the stub shaft 58 directly drives the sun gear 66; the sun gear 66 directly drives the planet gears 68; the planet gears 68 drive the planet carrier 72 via a connection with the planet pins 70; and the planet carrier 72 directly drives the output shaft 34. Again, as with the configuration shown in FIG. 2, to remove the brake component 38 (brake drum 38b), only the wheel rim 36 and adapter 40 need be removed. The wheel bearing 50 and double reduction gear set 80, including the planetary gear set 32 and the input gear set 82, do not have to be disassembled or removed. This reduces maintenance downtime and cost.

FIG. 2 shows a brake rotor 38a and FIG. 3 shows a brake drum 38b. It should be understood that a brake rotor 38a or a brake drum 38b could be used in the configuration of either FIG. 3 or FIG. 2.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A vehicle wheel assembly comprising:
    an input gear set;
    a planetary gear set driven by said input gear set;
    an output shaft driven by said planetary gear set; and
    a brake component mounted for rotation with said output shaft wherein said brake component is removable from the vehicle wheel assembly without requiring removal of said planetary gear set.

2. The vehicle wheel assembly according to claim 1 wherein said input gear set, said planetary gear set, and said output shaft are substantially enclosed within a common gear housing.

3. The vehicle wheel assembly according to claim 1 wherein said input gear set is adapted to receive driving input from an electric motor.

4. The vehicle wheel assembly according to claim 3 wherein said input gear set and said planetary gear set are positioned between said brake component and said electric motor, said electric motor being positioned closer to a longitudinal vehicle centerline than said brake component.

5. The vehicle wheel assembly according to claim 1 wherein said brake component comprises one of a brake drum and a brake rotor.

6. The vehicle wheel assembly according to claim 1 including an adapter mounted for rotation with said output shaft wherein said adapter couples said output shaft to said brake component.

7. The vehicle wheel assembly according to claim 1 wherein said input gear set comprises a pinion gear having a plurality of pinion gear teeth and an annular gear having a plurality of annular gear teeth formed about an outer circumferential surface, said plurality of pinion gear teeth being in direct driving engagement with said plurality of annular gear teeth.

8. The vehicle wheel assembly according to claim 7 wherein said annular gear is positioned inboard from said planetary gear set.

9. The vehicle wheel assembly according to claim 7 wherein said annular gear surrounds an outer circumference of said planetary gear set in an overlapping relationship.

10. The vehicle wheel assembly according to claim 1 wherein said planetary gear set includes a sun gear operably coupled to said input gear set, a plurality of planet gears in meshing engagement with said sun gear, and a planet carrier driven by said planet gears, said planet carrier being in direct driving engagement with said output shaft.

11. The vehicle wheel assembly according to claim 1 including a wheel rim mounted for rotation with said output shaft and at least one wheel bearing rotatably supporting said output shaft wherein said wheel rim is removable from the vehicle wheel assembly without requiring removal of said at least one wheel bearing.

12. A vehicle wheel assembly for an electric drive axle comprising:
    at least one electric motor having a motor shaft;
    an input gear set including an input pinion supported on said motor shaft;
    a planetary gear set including a sun gear driven by said input pinion and a plurality of planet gears fixed for rotation with a planet carrier;
    an output shaft driven by said planet carrier;
    an adapter mounted to an end of said output shaft remote from said planet carrier; and
    a brake component mounted to said adapter for rotation with said output shaft wherein said brake component is removable from said output shaft without requiring removal of said planetary gear set.

13. The vehicle wheel assembly according to claim 12 wherein said input gear set includes an annular gear positioned between said planetary gear set and said electric motor, said annular gear being in direct driving engagement with said input pinion and wherein said annular gear directly drives a stub shaft fixed to said sun gear.

14. The vehicle wheel assembly according to claim 12 wherein said input gear set includes an annular gear surrounding an outer circumference of said planetary gear set in an overlapping relationship, said annular gear being in direct driving engagement with said input pinion and wherein said annular gear includes a plate portion that directly interconnects said annular gear to a stub shaft that supports said sun gear.

15. The vehicle wheel assembly according to claim 12 wherein said input gear set and said planetary gear set are between said electric motor and said brake component with said electric motor being closer to a longitudinal vehicle centerline than said brake component.

16. The vehicle wheel assembly according to claim 12 including a gear housing substantially surrounding said input gear set, said planetary gear set, and said output shaft and including a bearing set having at least one wheel bearing mounted directly between said gear housing and said output shaft wherein said brake component is removable from said output shaft without requiring removal of said at least one wheel bearing.

17. A method for disassembling a vehicle wheel assembly including an input gear set, a planetary gear set driven by the input gear set, an output shaft driven by the planetary gear set, and a brake component supported for rotation with the output shaft comprising the steps of:

removing the brake component from the vehicle wheel assembly without removing the planetary gear set.

18. The method according to claim 17 including supporting a wheel rim on a wheel bearing for rotation with the output shaft and removing the brake component without removing the wheel bearing.

19. The method according to claim 17 including coupling an electric motor to the input gear set and positioning the input gear set and the planetary gear set between the electric motor and the brake component.

20. The vehicle wheel assembly according to claim 1 wherein said input gear set includes a drive gear that rotates about a first axis and wherein said planetary gear set includes a sun gear that rotates about a second axis that is offset from said first axis.

21. The vehicle wheel assembly according to claim 12 wherein said motor shaft defines a motor axis of rotation and said sun gear defines a sun gear axis of rotation that is parallel to and spaced apart from said motor axis of rotation.

22. The method according to claim 19 including the steps of rotating a drive gear from the input gear set about a first axis, and rotating a sun gear from the planetary gear set about a second axis spaced apart from the first axis.

* * * * *